June 18, 1940.                S. M. DEL CAMP                2,205,348
                           CORD ANCHORING DEVICE
                            Filed July 19, 1935
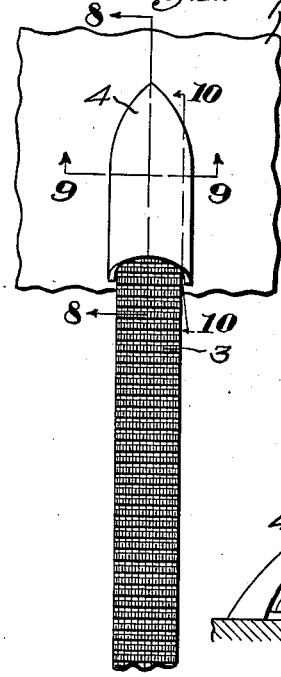
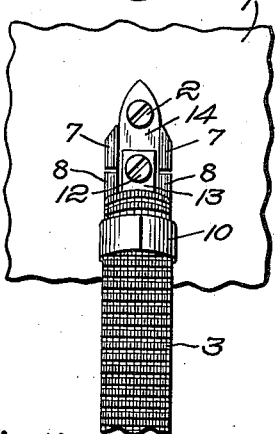
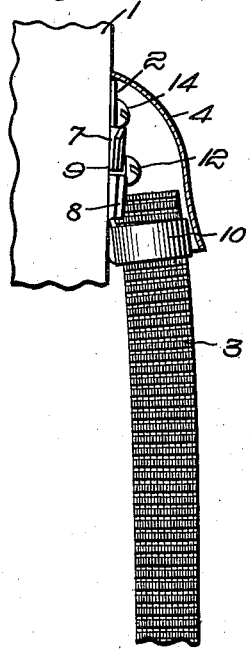
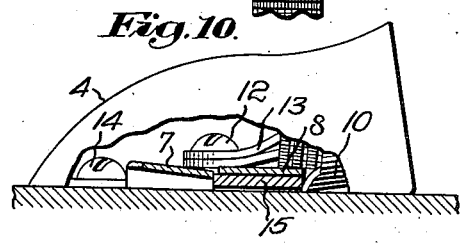
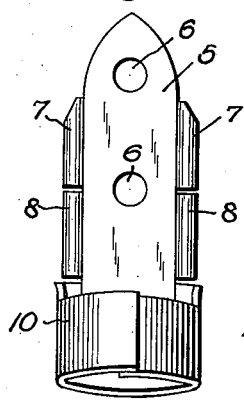
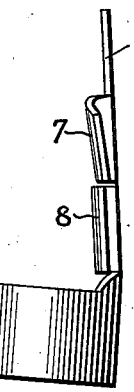
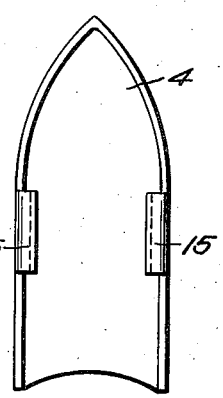
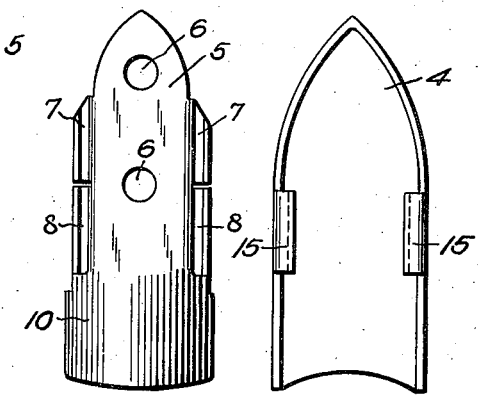
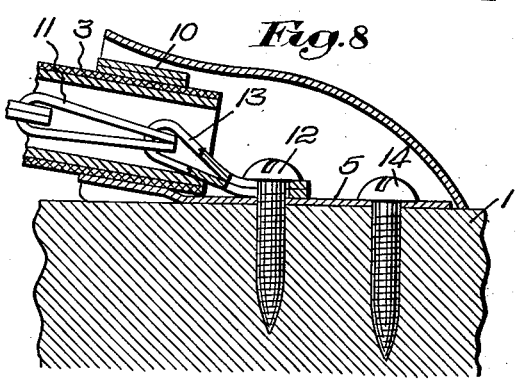
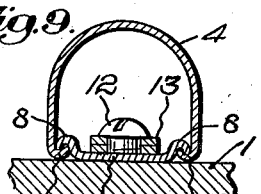
Inventor:
Scipione M. Del Camp.
by Walter S. Jones
Atty.

Patented June 18, 1940

2,205,348

UNITED STATES PATENT OFFICE 2,205,348

CORD-ANCHORING DEVICE

Scipione M. Del Camp, Maywood, Ill., assignor to Cinch Manufacturing Corporation, Chicago, Ill., a corporation of Illinois Application July 19, 1935, Serial No. 32,190

10 Claims. (Cl. 105—354)

My invention relates to improvements in brackets and the like fastening devices for anchoring a flexible cord or rope to automobile bodies and like structures.

In the illustration which represents a preferred embodiment of my invention:

Figure 1 is a front plan view of my cord-anchoring device with cord attached;

Fig. 2 is a front plan view of the attaching member of my anchoring device shown in Fig. 1 with the cover detached;

Fig. 3 is a side view of the attaching member of my anchoring device with cord attached, my metal finishing shield or cover being shown in cross-section;

Fig. 4 is a front view of the attaching member of my device;

Fig. 5 is a side view of the attaching member shown in Fig. 4;

Fig. 6 is a rear view of the attaching member of my device;

Fig. 7 is a bottom view of my metal shield or cover member;

Fig. 8 is an enlarged section taken along the line 8—8 of Fig. 1;

Fig. 9 is an enlarged section taken along the line 9—9 of Fig. 1; and

Fig. 10 is a section taken on the line 10—10 of Fig. 1 showing the manner in which the cover is locked to the attaching member.

One of the objects of my invention is to provide an anchoring device, adapted to secure a flexible cord or rope, such as a pull cord or robe cord, to the body of an automobile or other appropriate supporting structure. The device is so constructed that when the members are in final assembly all crude and unsightly attaching means, such as screws or bolts, are completely concealed from view thereby presenting an article of pleasing and attractive appearance.

In my preferred form, I have shown a rope handle secured to the inside of an automobile, but I do not wish to limit myself to this particular construction because there are other forms and uses to which my device may be adapted which fall within the scope and spirit of my invention.

Referring to the drawing, I have shown in Figs. 1, 2 and 3, the side of an automobile body 1, a metal attaching member 2 attached to the support 1, a flexible cord 3 secured to the member 2 and a hollow metal finishing shield or cover 4 fitted to the member 2 and completely concealing it, as most clearly shown in Fig. 1.

The attaching member 2, as illustrated in Figs. 4, 5 and 6, comprises a flat metal base portion 5 of definite width and length having a pair of apertures 6 of suitable size to receive an attaching member, such as a screw or bolt, for securing the member 2 to the support 1. Along opposite sides and integral with the base 5, I have constructed flanges extending upwardly from the base and then downwardly away from the base to form V-shaped guide portions. The flanges have been divided in two on each side of the base so as to form the two pairs 7—7 and 8—8. The flanges 8—8 are constructed with their V-shaped guide portions parallel to the base, but the guide portions of the flanges 7—7 are formed at an angle to the base (Fig. 5) so that an apex 9 is provided at the ends of the guides 7—7 facing the guides 8—8. Beyond the guides 8—8 the base 5 is formed into a ring-like portion 10 which is split longitudinally and of sufficient spring tension so that the two arms formed as a result of this split may clinch the ends of the flexible cord 3 thereby securely attaching it to the base portion. The securing means 10 extends at a slight angle from the base, as shown in Fig. 8, to anticipate the probable direction of force upon the cord 3.

In my preferred form, as a means of stiffening the cord 3, I have provided a core 11 which is constructed in the form of a chain and fastened to the base 5 by a screw or bolt 12 which passes through the last link 13 of the chain 11 and then through one of the apertures 6 into the supporting structure 1 as shown in Fig. 8. The screw or bolt 12 carries out a double purpose in that, as well as securing the chain 11 to the base 5, it also aids in securing the base to the support 1. Another screw or bolt 14 passes through the other aperture 6 of the base and into the support thereby cooperating with the means 12 to secure firmly the base to the support.

The metal finishing shield 4 is, in my preferred form, drawn to a bullet shape longitudinally, as illustrated in Fig. 7, and of a U-shaped cross-section, as shown in Fig. 9. At a predetermined point on both of the open edges of the shield 4 I have formed the ear-shaped portions 15 each of which is bent inwardly toward each other (Fig. 7) and adapted for engagement with the V-shaped guides of the flanges 7—7 and 8—8 of the attaching member.

In assembling the shield 4 with the attaching member 2, the shield is slipped over the attaching member until the ears 14 engage the inclined guides of the flanges 7—7. The ears are then passed along the inclined guides and forced between the apexes 9 and the supporting structure 1 into final engagement with the parallel guides of the flanges 8—8 as shown in Fig. 9. Enough space is provided between the apexes 9 and the support 1 to allow the passage of the ears 15 into the guides of the flanges 8—8, but after final engagement with the flanges 8—8, due to the form of the apexes, it is only with difficulty that the ears can be reinserted in the guides of the flanges 7—7 for the purpose of removing the shield from the attaching member. As a result the parts of my invention will be fastened together firmly enough to satisfy all practical purposes.

In final assembly of the parts, the shield 4 will completely conceal from view the screw or bolt heads 12 and 14 and also the ring-like securing portion 10 so that the smooth contour of the metal finishing shield is the only part of the anchoring device which is visible and an attractive appearance will be given to a widely used article of furnishing for the interior of automobiles.

I have shown in Fig. 10 the interlocking between the cover 4 and the base 5 by the ear 15 which is in a plane above the end of the flange 7 so that movement toward the flange will bring the ear 15 in contact therewith and prevent accidental removal of the cover. The cover may be removed when desired, especially if the support has a covering of yieldable material, such as upholstery, by pressing downwardly on the cover toward the base and then moving it longitudinally to let the ears 15—15 pass under the flanges 7—7.

While I have illustrated and described a preferred embodiment of my invention, I do not wish to be limited thereby, because the scope of my invention is best defined by the following claims.

I claim:

1. A cord-anchoring device comprising, in combination, a substantially flat metal attaching plate, a fastening means consisting of a substantially ring-shaped portion integral with one end of said plate and extending outwardly therefrom, said ring-shaped portion being split longitudinally forming two arms between which a cord may be held by spring pressure, and a hollow metal shield adapted to fit over said plate and said fastening means whereby said parts are concealed from view, said shield and said plate having interengaging means whereby said shield may be secured to said plate by a predetermined action after said plate has been attached.

2. A cord-anchoring device comprising, in combination, a substantially flat metal attaching plate having ear-shaped flanges extending outwardly from the longitudinal edges thereof, a fastening means consisting of a flat ring-like portion integral with one end of said plate and extending outwardly therefrom, said ring-like portion being split longitudinally forming two spring arms adapted to clinch the end of a flexible cord whereby said cord may be secured to said plate, and a metal shield of U-shaped cross-section having an ear-shaped flange extending inwardly from each of the longitudinal edges thereof, said last named flanges adapted for cooperative fastening engagement with the flanges of said attaching plate whereby said shield may be secured to said plate by a predetermined action after said plate has been attached.

3. A cord-anchoring device comprising, in combination, a flat metal attaching plate of definite length and width, a fastening means consisting of a flat ring-like portion integral with one end of said plate and extending outwardly therefrom, said ring-like portion being split longitudinally to form two spring arms adapted to clinch a portion of a flexible cord by spring pressure, V-shaped flanges integral with the longitudinal edges of said plate, and a metal shield of definite size and U-shaped in cross-section having an ear-shaped flange integral with each of the longitudinal edges thereof, said flanges adapted for cooperative fastening engagement with said V-shaped flanges whereby said shield is secured to said plate after said plate has been attached.

4. A cord-anchoring device of the class described comprising a substantially flat metal attaching plate of definite length and width having apertures therein of suitable size for receiving an attaching member whereby said plate may be attached to a supporting structure, said plate having V-shaped flanges integral with the longitudinal edges thereof, a part of the flanges on each side having guide grooves forming an angle with said edges, the remainder of said flanges having guide grooves parallel to said edges, a fastening means integral with said plate whereby a flexible cord may be attached thereto and means associated with said plate for anchoring a core of said cord therewith, and a hollow metal shield of definite size adapted to fit over said plate and conceal said plate and said fastening means, ear-shaped flanges integral with each of the longitudinal edges of said shield and extending inwardly from said edges, said ear-shaped flanges adapted to be forced by the angled grooved flanges of said plate and into engagement with said parallel grooved flanges, said flanges cooperating to prevent the withdrawal of said ear-shaped flanges.

5. A cord-anchoring device of the class described comprising, in combination, a substantially flat metal plate of definite length and width having apertures therein for receiving an attaching member whereby said plate may be attached to a supporting structure, said plate having a pair of V-shaped guides integral with each of the longitudinal edges thereof, one of said guides on each side of said plate forming an angle with the edge of said plate whereby an apex is formed at one of the ends of said guides, the other of said guides on each side of said plate being parallel to said edges, a cord-engaging means consisting of a flat ring-like portion integral with one end of said plate and extending outwardly therefrom, said ring-like portion being split longitudinally whereby two overlapping arms are formed adapted to clinch the end of a flexible cord thereby securing said cord to said plate, a core of said cord adapted to be anchored to one of said support-engaging screws or bolts, and a hollow metal shield of definite size adapted to fit over said plate and conceal said plate and said cord-engaging means, said shield having ear-shaped flanges at predetermined points on the longitudinal edges of said shield and extending inwardly from said edges, said flanges adapted to be forced by the apex of the angled guides of said plate and into engagement with said parallel guides, the apex of said angled guides preventing the ready withdrawal of said flanges.

6. A cord-anchoring installation comprising, in combination, a supporting structure, a substantially flat metal plate secured thereto, said plate having a fastening means consisting of a flat ring-like portion integral with one end thereof and extending outwardly therefrom, said ring-like portion being split longitudinally forming two spring arms, a flexible cord having a portion clenched between said spring arms whereby said cord is secured to said plate, and a metal shield of U-shaped cross-section adapted to fit over said plate and said fastening means whereby said parts are concealed from view, said shield and said plate having interengaging means whereby said shield is secured to said plate by a predetermined action after said plate has been attached to said supporting structure.

7. A cord-anchoring installation comprising, in combination, a supporting structure, a substantially flat metal plate secured thereto, said plate having ear-shaped flanges extending outwardly from the longitudinal edges thereof, a fastening means consisting of a flat ring-like portion integral with one end of said plate and extending outwardly therefrom, said ring-like portion being split longitudinally to form the spring arms, a flexible cord having a portion gripped by said spring arms whereby said cord is secured to said plate, and a metal shield of U-shaped cross-section having an ear-shaped flange extending inwardly from each of the longitudinal edges thereof, said last-named flanges adapted for cooperative fastening engagement with the flanges of said attaching plate whereby said shield is secured to said plate.

8. A cord-anchoring installation comprising, in combination, a supporting structure, a substantially flat metal plate of definite length and width having apertures therein, attaching members extending through said apertures into said supporting structure whereby said plate is secured to said supporting structure, said plate having a pair of V-shaped guides integral with each of the longitudinal edges thereof, one of said guides on each side of said plate forming an angle with the edge of said plate whereby an apex is formed at one of the ends of said guides, the other of said guides on each side of said plate being parallel to said edges, a fastening means consisting of a flat ring-like portion integral with one end of said plate and extending outwardly therefrom, said ring-like portion being split longitudinally to form two spring arms, a flexible cord having a portion clenched between said spring arms whereby said cord is secured to said plate, said cord having an inner core construction anchored to one of said attaching members, and a hollow metal shield of definite size adapted to fit over said plate and conceal said plate and said fastener means, said shield having ear-shaped flanges at predetermined points on the longitudinal edges of said shield and extending inwardly from said edges, said flanges adapted to be forced by the apex of the angled guides of said plate and into engagement with said parallel guides, the apex of said angled guides preventing the ready withdrawal of said flanges.

9. A fastening for a tubular cord member having a chain extending through the center, comprising a bracket to which the chain is secured, the bracket being provided with a clamp portion engaging about the end of the cord member and securing the same to the bracket, a series of lugs on opposite sides of the bracket arranged in two pairs and a cover slidable over the bracket and provided with a pair of lugs, the lugs of the cover engaging beneath the first pair of lugs of the bracket and the first pair of lugs being arranged to guide the lugs of the cover into engagement beneath the second pair of lugs as the cover is moved longitudinally in one direction, the lugs of the cover when engaged beneath the second pair of lugs of the bracket being prevented from movement in one direction by said first pair of lugs of the bracket and being prevented from movement in the opposite direction by the clamp portion of the bracket.

10. A cord fastening for use with cords having a hollow center provided with a chain extending therethrough, comprising a bracket to which the chain is secured, the bracket being provided with a portion to which the cord is secured independently of the chain, a cover for the bracket, the bracket being provided with lugs and the cover being provided with companion lugs engaging beneath the lugs of the bracket.

SCIPIONE M. DEL CAMP.